(12) United States Patent
Yoneda et al.

(10) Patent No.: US 11,729,331 B2
(45) Date of Patent: Aug. 15, 2023

(54) SERVICE PROVIDING SYSTEM TO GENERATE DUPLICATED APPLICATION AND TRANSMIT IT TO THE ELECTRONIC DEVICE FOR DISPLAY ON A DISPLAY, INFORMATION PROCESSING METHOD, AND NON-TRANSITORY RECORDING MEDIUM

(71) Applicants: Hiroki Yoneda, Kanagawa (JP); Yohta Kimura, Tokyo (JP)

(72) Inventors: Hiroki Yoneda, Kanagawa (JP); Yohta Kimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/648,838

(22) Filed: Jan. 25, 2022

(65) Prior Publication Data
US 2022/0272209 A1    Aug. 25, 2022

(30) Foreign Application Priority Data
Feb. 25, 2021    (JP) .................................. 2021-028664

(51) Int. Cl.
*H04N 1/00*    (2006.01)

(52) U.S. Cl.
CPC ....... *H04N 1/0097* (2013.01); *H04N 1/00114* (2013.01); *H04N 1/00411* (2013.01); *H04N 1/00973* (2013.01); *H04N 1/00408* (2013.01); *H04N 2201/0094* (2013.01)

(58) Field of Classification Search
None
See application file for complete search history.

(56) References Cited

U.S. PATENT DOCUMENTS

| 8,368,914 B2* | 2/2013 | Ohara ............... H04N 1/00474 |
| | | 358/1.15 |
| 2007/0028187 A1 | 2/2007 | Katsuyama |
| 2012/0144329 A1* | 6/2012 | Sasaki ................. G06F 3/1204 |
| | | 715/764 |
| 2018/0039453 A1* | 2/2018 | Nakajima ............... G06F 21/10 |
| 2019/0281178 A1* | 9/2019 | Han .......................... G06F 8/61 |
| 2021/0006675 A1* | 1/2021 | Mulin ................. G06F 3/04883 |

FOREIGN PATENT DOCUMENTS

| JP | 2006-303805 | 11/2006 |
| JP | 2007-041726 | 2/2007 |
| JP | 2008-234230 | 10/2008 |
| JP | 2014-109976 | 6/2014 |
| JP | 2015-141464 | 8/2015 |

* cited by examiner

*Primary Examiner* — Haris Sabah
(74) *Attorney, Agent, or Firm* — IPUSA, PLLC

(57) ABSTRACT

A service providing system and an information processing method. The service providing system stores in one or more memories, a plurality of settings of an application that receives an execution request from the electronic device, duplicates the application that uses one of the plurality of settings stored in the one or more memories to generate duplicated application, and transmits information on the duplicated application to the electronic device, and the electronic device displays on a display, a screen for selecting an application to be executed by a user, the screen including the duplicated application for selection by the user.

8 Claims, 22 Drawing Sheets

FIG. 3

| APPLICATION ID | USER ID | FOLDER SETTINGS | PRINT COLOR | NUMBER OF COPIES | PAGE SIZE |
|---|---|---|---|---|---|
| 12345 | USER1 | DOCUMENT | COLOR | 2 | A3 |
| 67890 | DEMO | PHOTO | MONOCHROME | 1 | A4 |
| ... | ... | ... | | | |

FIG. 7

| USER ID | TENANT ID | ORGANIZATION ID |
|---|---|---|
| 11111 | 33333 | 0010 |
| 22222 | 33333 | 0012 |

| APPLICATION ID | APPLICATION INSTANCE ID | USER ID | EXECUTION TIME |
|---|---|---|---|
| 000001 | 000001 | 11111 | 202002271310 |
| 000001 | 000002 | 22222 | 202002271420 |
| 000002 | 000003 | 33333 | 202002281530 |
| 000001 | 000001 | 11111 | 202002291640 |

| APPLICATION ID | INITIAL SETTINGS (DEFAULT PARAMETERS) |
|---|---|
| 000001 | {⋯} |
| ... | ... |

| APPLICATION ID | APPLICATION INSTANCE ID | USER ID | SETTINGS SHARING POSSIBILITY | SETTINGS (PARAMETERS) |
|---|---|---|---|---|
| 000001 | 000001 | 11111 | TRUE | (SETTINGS 1) |
| 000001 | 000002 | 22222 | FALSE | (SETTINGS 1) |
| 000002 | 000005 | 11111 | TRUE | (SETTINGS 2) |
| 000001 | 000006 | 22222 | FALSE | (SETTINGS 2) |

⋮

```
{
"settings": {
            "name": "putFile",
            "componentName": "OutsvDrive4Biz",
            "operationName": "putFile",
            "parameters": {
                "conflictBehavior": "rename",
                "parentPath": null,
                "parentId": null,
                "filename": "temp",
                "defaultFolder": "root",
            }
        }
}
```

FIG. 15

| APPLICATION INSTANCE ID | USER ID |
|---|---|
| 000001 | 11111 |
| 000002 | 22222 |
| 000003 | 33333 |
| 000001 | 11111 |
| 000001 | 11111 |
| 000003 | 33333 |
| 000001 | 11111 |
| 000004 | 44444 |
| ... | ... |

FIG. 16

| APPLICATION INSTANCE ID | USER ID | NUMBER OF EXECUTIONS |
|---|---|---|
| 000004 | 44444 | 5 |
| 000001 | 11111 | 4 |
| 000003 | 33333 | 2 |
| 000002 | 22222 | 1 |

FIG. 18

| ORGANIZATION ID | ORGANIZATION NAME | PARENT ORGANIZATION ID | CHILD ORGANIZATION ID |
|---|---|---|---|
| 0001 | DIVISION A | NULL | [0002, 0003, 0004] |
| 0002 | DEVELOPMENT CENTER A | 0001 | [0005, 0006] |
| 0003 | DEVELOPMENT CENTER B | 0001 | [0007] |
| 0004 | DEVELOPMENT CENTER C | 0001 | [0008, 0009] |
| 0005 | DEVELOPMENT SECTION A | 0002 | [....] |
| 0006 | DEVELOPMENT SECTION B | 0002 | [....] |

FIG. 20

| TARGET USER ID | DISTANCE BETWEEN USERS |
|---|---|
| 11111 | 1 |
| 22222 | 3 |
| 33333 | 2 |
| 44444 | 6 |

FIG. 21

| TARGET USER ID | DISTANCE BETWEEN USERS | NUMBER OF EXECUTIONS |
|---|---|---|
| 44444 | 6 | 5 |
| 11111 | 1 | 4 |
| 33333 | 2 | 2 |
| 22222 | 3 | 1 |

FIG. 22

| TARGET USER ID | DISTANCE BETWEEN USERS | NUMBER OF EXECUTIONS |
|---|---|---|
| 11111 | 1 | 4 |
| 33333 | 2 | 2 |
| 22222 | 2 | 1 |
| 44444 | 6 | 5 |

FIG. 24

XXXXX SMART INTEGRATION  ⊙  ✱ DEVELOPMENT SPECIAL MISSION ▶

TOP

APPLICATION DUPLICATION MANAGEMENT

NUMBER OF CASES [20]  [SEARCH] [CLEAR SEARCH RESULT]  NUMBER OF SEARCHED USERS: 3

[APPROVE ALL ▶]

| ☐ | ROLE | USER ID ▲ | EMAIL ADDRESS | FAMILY NAME | FIRST NAME |
|---|---|---|---|---|---|
| ☐ | 👤 | 111111 | 111111@EXAMPLE.COM | TANAKA | TAROH |
| ☐ | 👤 | 222222 | 222222@EXAMPLE.COM | NAGUMO | TAKU |
| ☐ | 👤 | 333333 | 333333@EXAMPLE.COM | YAMADA | NAOKO |

NUMBER OF CASES [20]  ⏮ ▼ 1/1 ▲ ⏭ ▶

[APPROVAL SCREEN]

SERVICE PROVIDING SYSTEM TO GENERATE DUPLICATED APPLICATION AND TRANSMIT IT TO THE ELECTRONIC DEVICE FOR DISPLAY ON A DISPLAY, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-028664, filed on Feb. 25, 2021, in the Japan Patent Office, the entire disclosure of which is hereby incorporated by reference herein.

BACKGROUND

Technical Field

The present disclosure relates to a service providing system, an information processing method, and a non-transitory recording medium.

Related Art

By linking with a cloud service, uploading documents scanned by an image forming apparatus connected to a network and printing documents stored in a cloud storage are possible. Furthermore, by combining with functions such as optical character recognition (OCR), image cropping, and barcode authentication, a workflow application with a high degree of freedom and functionality is created, and such workflow application is executed on an operation terminal of the image forming apparatus. In the workflow application, a user can set in advance on a dedicated site, color for printing, number of sheets to be printed, an upload destination of a cloud storage, etc. With these settings, it is possible to omit setting print settings and browsing a file on the operation terminal of the image forming apparatus. For example, a mechanism is disclosed in which a user first specifies a parameter and then provides the image forming apparatus with desired analysis information by a simple operation.

SUMMARY

Embodiments of the present disclosure describe a service providing system and an information processing method. The service providing system stores in one or more memories, a plurality of settings of an application that receives an execution request from the electronic device, duplicates the application that uses one of the plurality of settings stored in the one or more memories to generate duplicated application, and transmits information on the duplicated application to the electronic device, and the electronic device displays on a display, a screen for selecting an application to be executed by a user, the screen including the duplicated application for selection by the user.

BRIEF DESCRIPTION I/F THE DRAWINGS

A more complete appreciation of the disclosure and many of the attendant advantages and features thereof can be readily obtained and understood from the following detailed description with reference to the accompanying drawings, wherein:

FIG. 3 is a diagram illustrating an example of settings of an application;

FIG. 7 is a diagram illustrating an example of a user management database;

FIG. 8 is a diagram illustrating an example of an application execution log database;

FIG. 9 is a diagram illustrating an example of an application setting management database;

FIG. 10 is a diagram illustrating an example of an application instance settings management database;

FIG. 15 is a diagram illustrating an example of a list in which data of an application identifier (ID) to be investigated is extracted from an application execution log;

FIG. 16 is a diagram illustrating an example of a list aggregated from an extracted list in descending order of a number of executions;

FIG. 18 is a diagram illustrating an example of an organization database;

FIG. 20 is a diagram illustrating an example of a list of distances between users with respect to a target user;

FIG. 21 is a diagram illustrating an example of a list in which the distance between users and the number of executions are combined;

FIG. 22 is a diagram illustrating an example of a list sorted in ascending order of distance between users;

FIG. 24 is a diagram illustrating an example of an application duplication request management screen;

Figure 1:
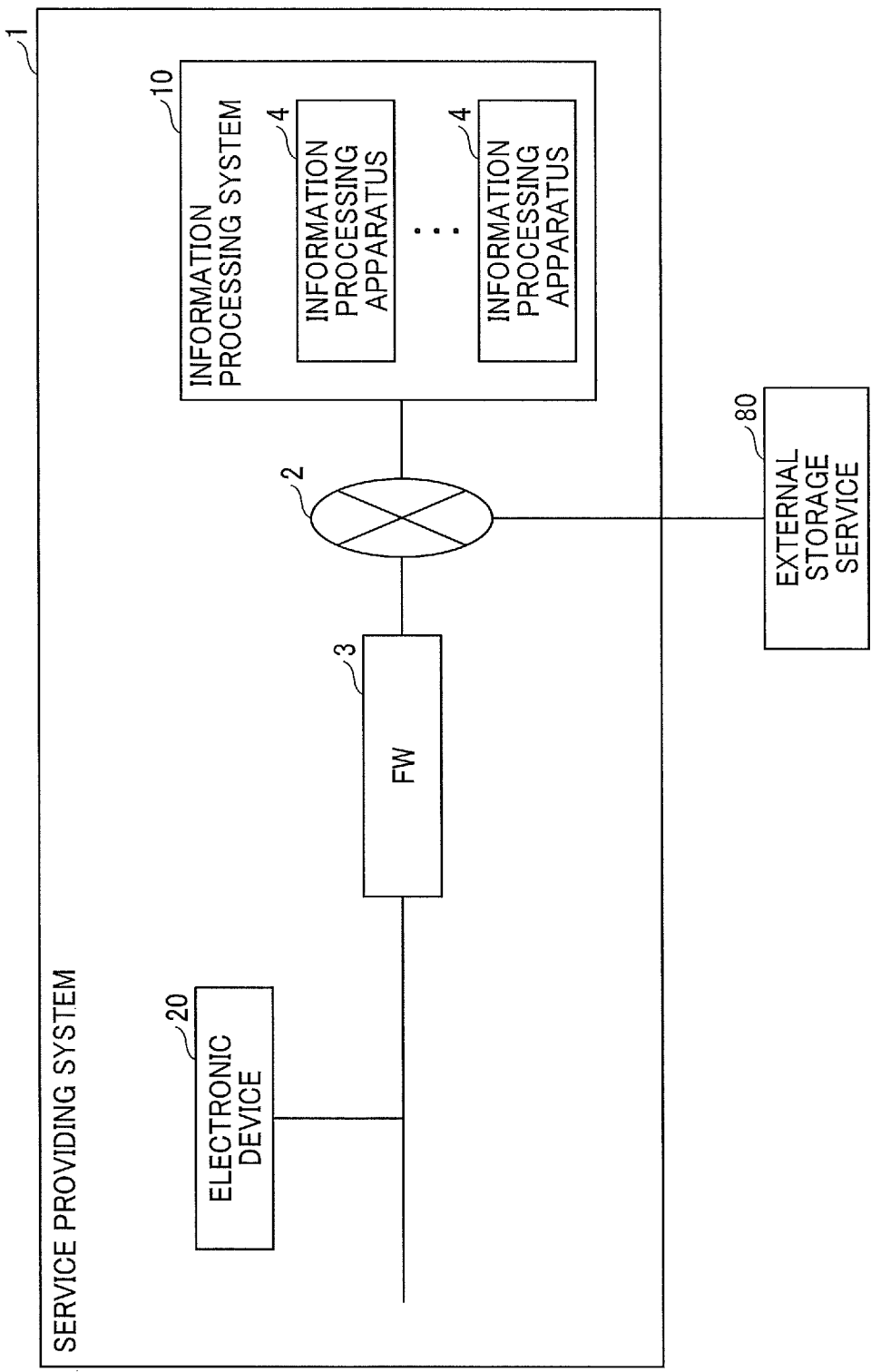
FIG. 1 is a diagram illustrating an example of a configuration of a service providing system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an example of a configuration of a service providing system according to the present embodiment is described with reference to accompanying drawings.

In the service providing system 1 illustrated in FIG. 1, an electronic device 20 is connected to an information processing system 10 through a network 2 such as the internet and a firewall (FW) 3. By using the electronic device 20 connected to the network, a user can use various applications such as print, scan, and document upload, or services. The user's account is centrally managed on cloud (network), and available electronic devices 20 and services are also managed. The user or an administrator is authenticated when logging in from the electronic device 20 to use the service or perform management work. Also, when executing the application, an authentication process for accessing an external storage service such as cloud storage used by each user is performed.

Figure 2:
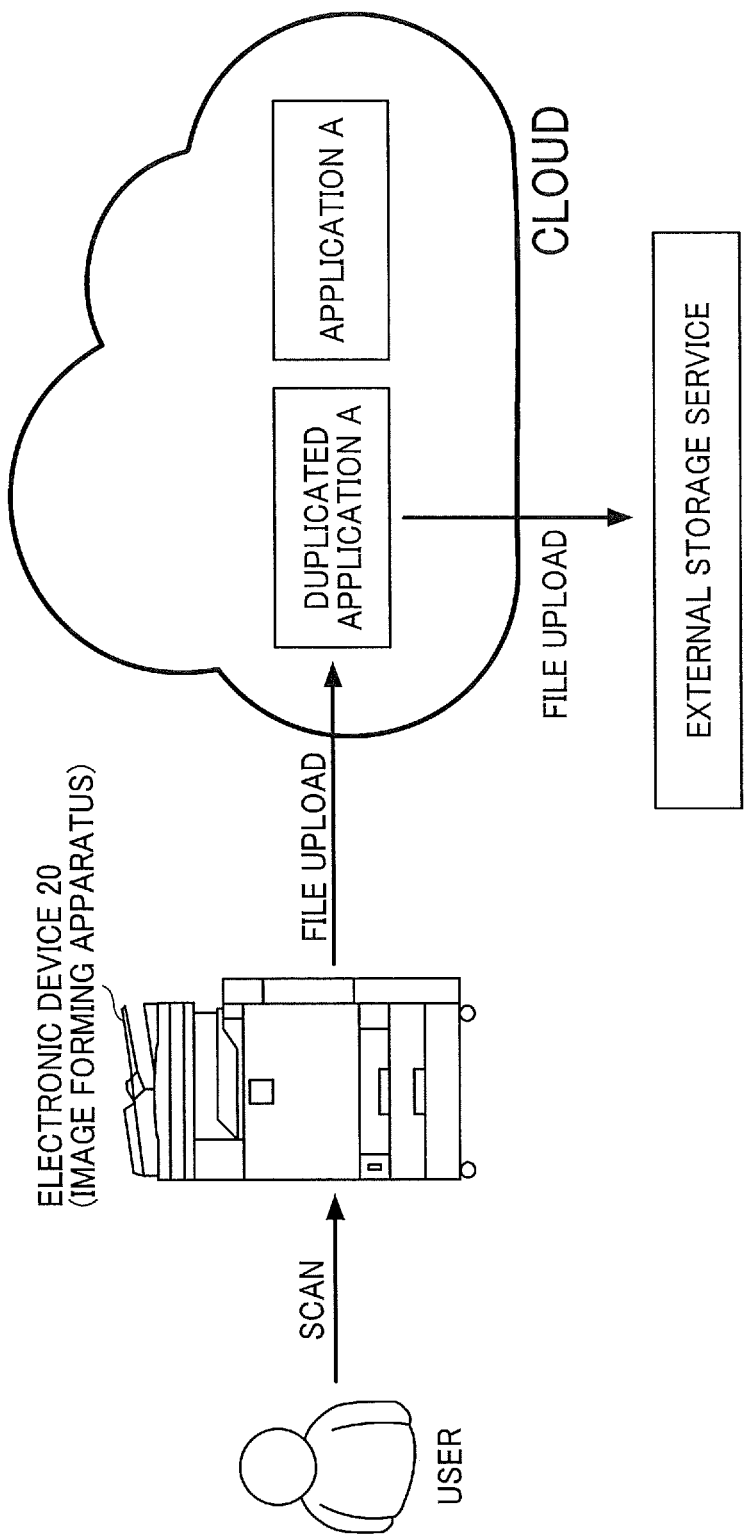
FIG. 2 is a diagram illustrating an example of a usage pattern of a duplicated application.

The information processing system 10 of the present embodiment analyzes the frequency in use of application settings by the electronic device 20, and the application is duplicated using frequently used settings, thus improving user operability in setting work. In this disclosure, duplicating an application means creating another copy of the application, and the added application may have different settings from the original application. Also, in order to distinguish the duplicated application icon from the original application icon, identification information is added to the icon. FIG. 2 is a diagram illustrating an example of the application that uploads a file to an external storage service using the duplicated application. The application A and the duplicated application A are displayed on a control panel of the electronic device 20 (image forming apparatus). The user selects the duplicated application A on the control panel of the electronic device 20 and scans a file. The electronic device 20 uploads the scanned file to the cloud. Further, the duplicated application A performs a process such as adding a time stamp on the file to be uploaded, and then uploads the file to the external storage service. Here, since the duplicated application A is set with the application necessary for the process to be executed, it is not necessary for the user to make these settings on the control panel of the electronic device 20 before executing the application. FIG. 3 is a diagram illustrating an example of settings of the duplicated application. As illustrated in the figure, the application ID, user ID, folder where files are saved (folder setting), color setting at the time of printing (print color), number of copies, page size, etc. are stored in the information processing system 10 as the settings of the duplicated application. The user ID and the application ID are each identification information that identifies the user and the application in the information processing system 10. Hereinafter, the ID is used to indicate identification information of any other element.

The information processing system 10 may be implemented by one information processing apparatus 4 or may be implemented by a plurality of information processing apparatuses 4 such as by distributing the functions over the plurality of information processing apparatuses 4. For example, each service may be provided by one information processing apparatus 4, one information processing apparatus 4 may provide a plurality of services, or a plurality of information processing apparatuses 4 may provide one service.

Further, the information processing system 10 may be compatible with cloud computing. The cloud computing refers to a usage pattern in which resources on a network are used without being aware of specific hardware resources. The information processing system 10 that supports cloud computing may be referred to as a cloud system. The information processing system 10 may be on the internet or on-premises.

Further, the information processing system 10 creates screen information of a web page to be displayed on the electronic device 20 and transmits the screen information. The screen information is created by Hypertext Markup Language (HTML), Extensible Markup Language (XML), Cascade Style Sheet (CSS), JAVASCRIPT (registered trademark), and the like. The web page may be provided by a web application. The web application refers to software or a mechanism that is executed on the web browser and operates by coordinating a program in a programming language (for example, JAVASCRIPT (registered trademark)) that operates on the web browser with a program on the web server. The web application can also dynamically change the web page.

The electronic device 20 is, for example, an image forming apparatus, and examples of the image forming apparatus include a laser printer, a multi-function peripheral (MFP), and the like. Further, other examples of the electronic device 20 include an electronic whiteboard (interactive white board (IWB): a white board including an electronic whiteboard function capable of intercommunication). In addition, other examples of the electronic device 20 include an output device such as a projector (PJ), a digital signage, a head up display (HUD) device, an industrial machine, an imaging device, a sound collecting device, a medical device, a network home appliance, an automobile (a connected car), a notebook personal computer (PC), a mobile phone, a smartphone, a tablet terminal, a game machine, a personal digital assistant (PDA), a digital camera, a wearable PC, a desktop PC, or the like.

Figure 4:
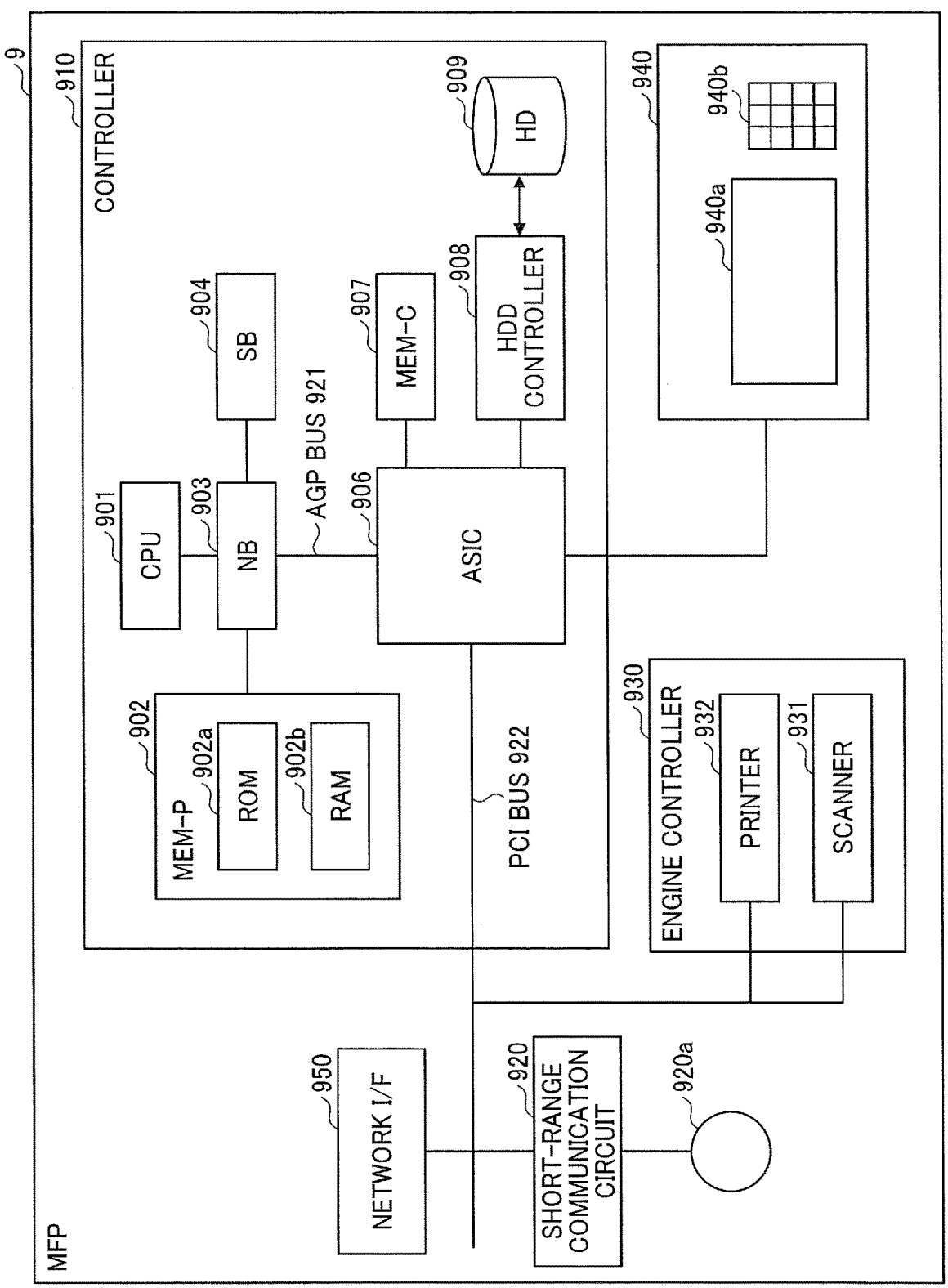
FIG. 4 is a block diagram illustrating an example of a hardware configuration of an electronic device (image forming apparatus)

FIG. 4 is a block diagram illustrating a hardware configuration of the image forming apparatus (MFP 9) as an example of the electronic device 20. As illustrated in FIG. 4, the MFP 9 includes a controller 910, a short-range communication circuit 920, an engine controller 930, a control panel 940, and a network interface (I/F) 950. Further, the control panel 940 includes a display panel 940*a* that accepts input from the user, and a numeric keypad 940*b* that also accepts input from the user. The controller 910 includes a central processing unit (CPU) 901 as a main processor, a system memory (MEM-P) 902, a north bridge (NB) 903, a south bridge (SB) 904, an Application Specific Integrated Circuit (ASIC) 906, a local memory (MEM-C) 907 as a storage unit, a hard disk drive (HDD) controller 908, and a hard disk (HD) 909 as a storage unit. The NB 903 and the ASIC 906 are connected through an Accelerated Graphics Port (AGP) bus 921.

The CPU 901 is a processor that performs overall control of the MFP 9. The NB 903 connects the CPU 901 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a read only memory (ROM) 902*a* as a memory that stores program and data for implementing various functions of the controller 910 and further includes a random access memory (RAM) 902*b* as a memory that deploys the program and data, or as a drawing memory that stores drawing data for printing. The program stored in the ROM 902*a* may be stored in any computer-readable storage medium, such as a compact disc-read only memory (CD-ROM), compact disc-recordable (CD-R), or digital versatile disc (DVD), in a file format installable or executable by the computer for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a Universal Serial Bus (USB) interface, or the Institute of Electrical and Electronics Engineers 1394 (IEEE1394) interface.

Figure 5:
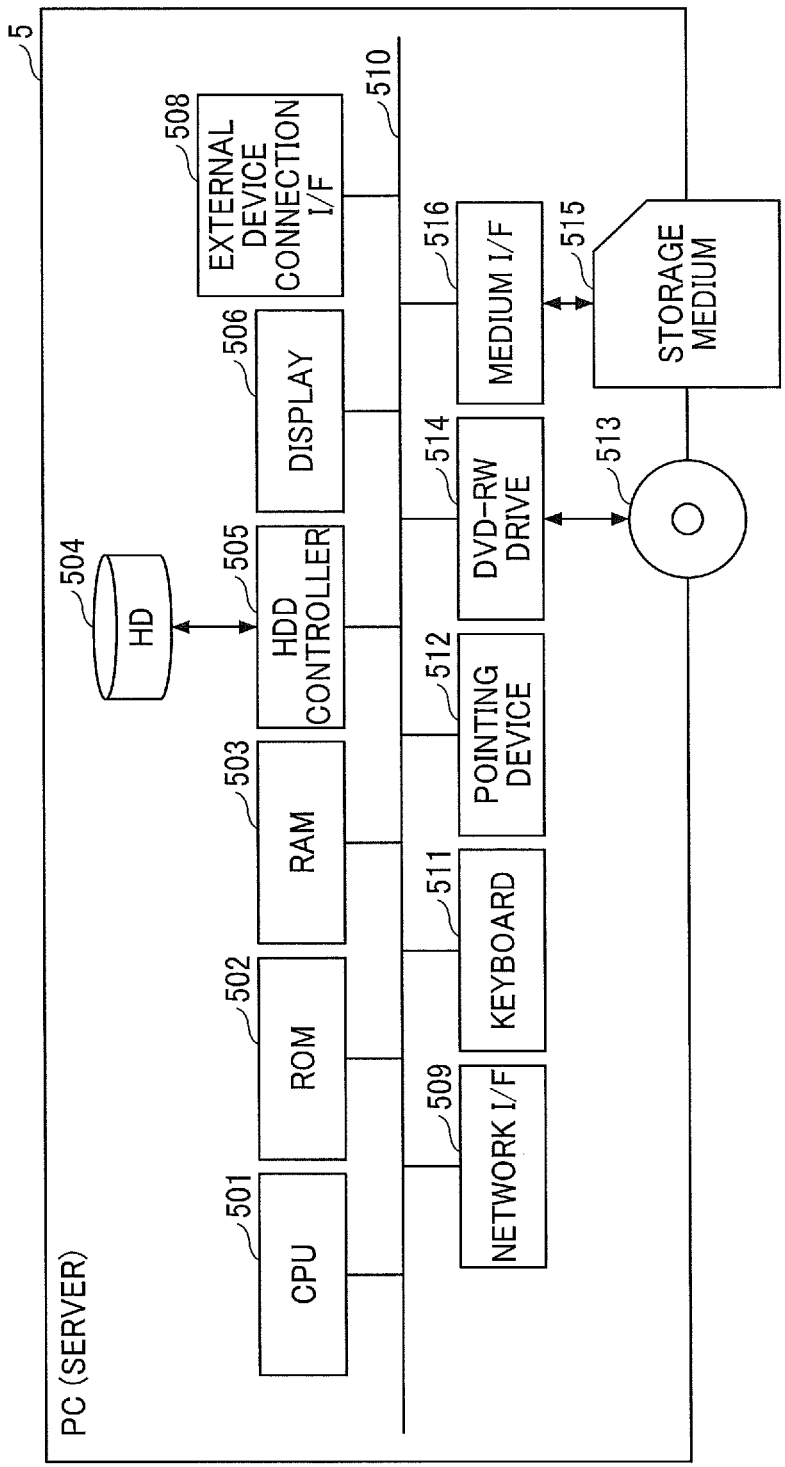
FIG. 5 is a block diagram illustrating an example of a hardware configuration of an information processing system.

FIG. 5 is a hardware configuration diagram of a PC (server) 5 which is an example of the information processing system 10. As illustrated in FIG. 5, the PC 5 is implemented by a computer, and includes a CPU 501, a ROM 502, a RAM 503, an HD 504, an HDD controller 505, a display 506, an external device connection I/F 508, a network I/F 509, a bus line 510, a keyboard 511, a pointing device 512, a digital versatile disc rewritable (DVD-RW) drive 514, and a medium I/F 516.

The CPU 501 controls entire operation of the service providing system 1. The ROM 502 stores the program such as an initial program loader (IPL) used for executing the CPU 501. The RAM 503 is used as a work area for the CPU 501. The HD 504 stores various data such as the programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a USB memory or a printer. The network I/F 509 is an interface for performing data communication using the network 2. The bus line 510 is an address bus, a data bus, or the like for electrically connecting each component such as the CPU 501 illustrated in FIG. 3.

Further, the keyboard 511 is an example of input device including a plurality of keys used for inputting characters, numerical values, various instructions, and the like. The pointing device 512 is another example of the input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to a storage medium 515 such as a flash memory.

Figure 6:
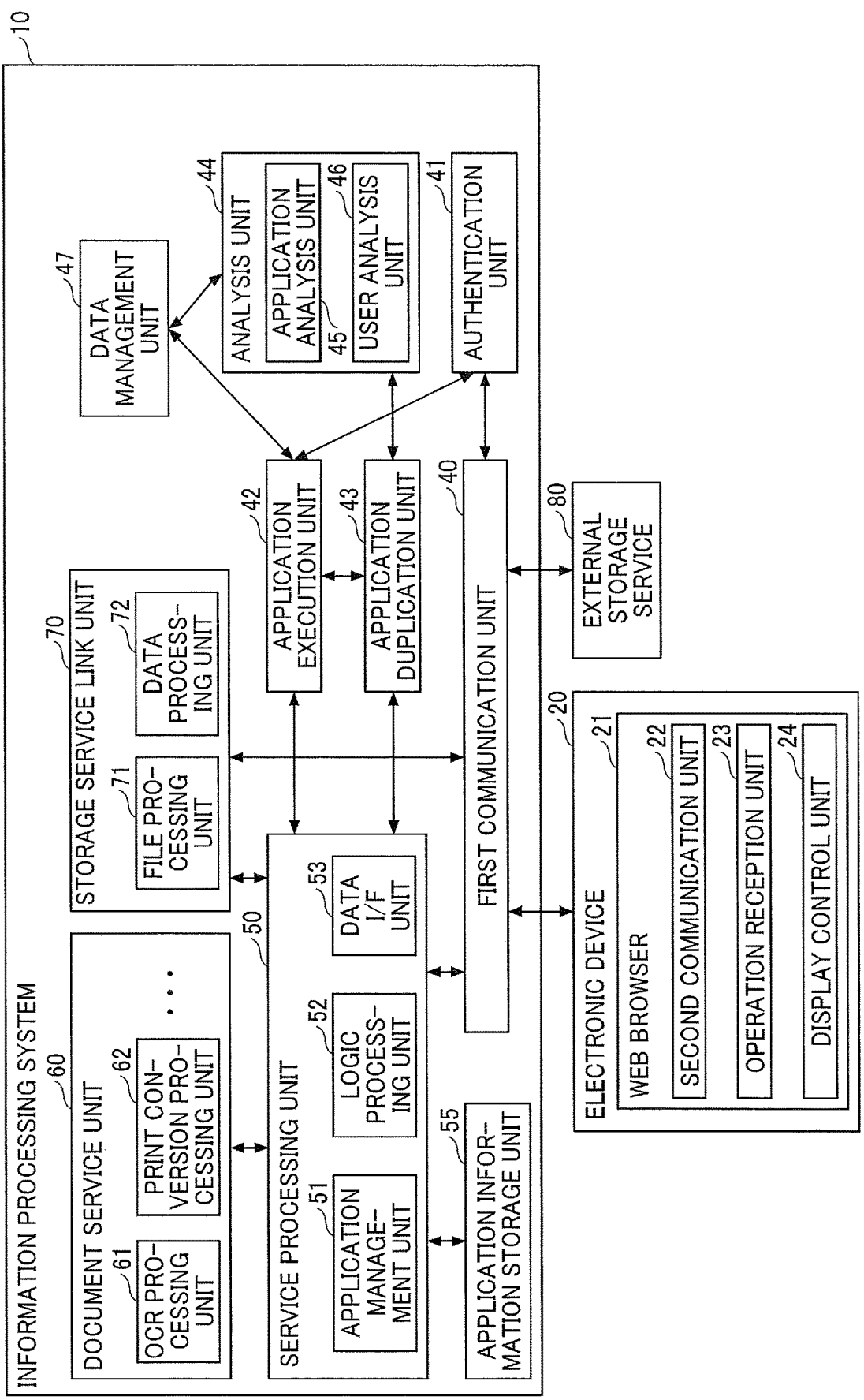
FIG. 6 is a block diagram illustrating an example of a functional configuration of a service providing system.

With reference to FIG. 6, a functional configuration of the service providing system 1 according to the present embodiment is described. FIG. 6 is a diagram illustrating an example of the functional configuration of the service providing system 1 according to the present embodiment.

The information processing system 10 includes a first communication unit 40, an authentication unit 41, an application execution unit 42, an application duplication unit 43, an analysis unit 44, a data management unit 47, a service processing unit 50, an application information storage unit 55, a document service unit 60, and a storage service link unit 70. Each of these functional units is implemented by the CPU 501 executing an instruction included in one or more programs installed in the information processing system 10.

The first communication unit 40 transmits and receives various information to and from the electronic device 20 and the external storage service 80.

The authentication unit 41 receives a login request to the information processing system 10, executes user authentication based on the received authentication information, and outputs the result. In the user authentication, authentication using a password may be used, or other methods may be used. The authentication unit 41 also manages authentication information used by the user in accessing the service on the cloud.

The application execution unit 42 acquires the information on the application and executes the designated application in response to the request from the logic processing unit 52.

The application information storage unit 55 stores for each application, an identifier (ID) assigned to each application and information including screen definitions and processing contents as application information. The screen definition includes data definition and layout information that make up a screen of the application. The web browser 21 of the electronic device 20 generates a screen based on the received HTML-based screen definition. The processing content includes information on the processing content executed by the application, and the application execution unit 42 requests the document service unit 60 and the storage service link unit 70 to execute the processing based on the processing content. In addition, the information on each application includes the user ID of the user who can use the application and an ID of the external service with which the application is linked.

The application duplication unit 43 duplicates the application based on the application settings received from the data management unit 47. Regarding the duplication method, the "screen definition" and "processing content"

may be duplicated, or the identifiers of "screen definition" and "processing content" before duplication are managed in association with the application ID and user ID after duplication. In a case of managing by associating, "screen definition" and "processing content" do not have to be duplicated. The identification information is dynamically added to the duplicated application icon. For the information to be added, for example, "_folder name" is added after the application name, and the setting value different from the settings of the duplication source is dynamically acquired and displayed on the icon.

The data management unit 47 manages data related to the user and the user's application execution history, specifically, stores the data, sends and receives data to and from the analysis unit 44, and requests the analysis unit 44 to analyze the data.

Figures 11, 12:
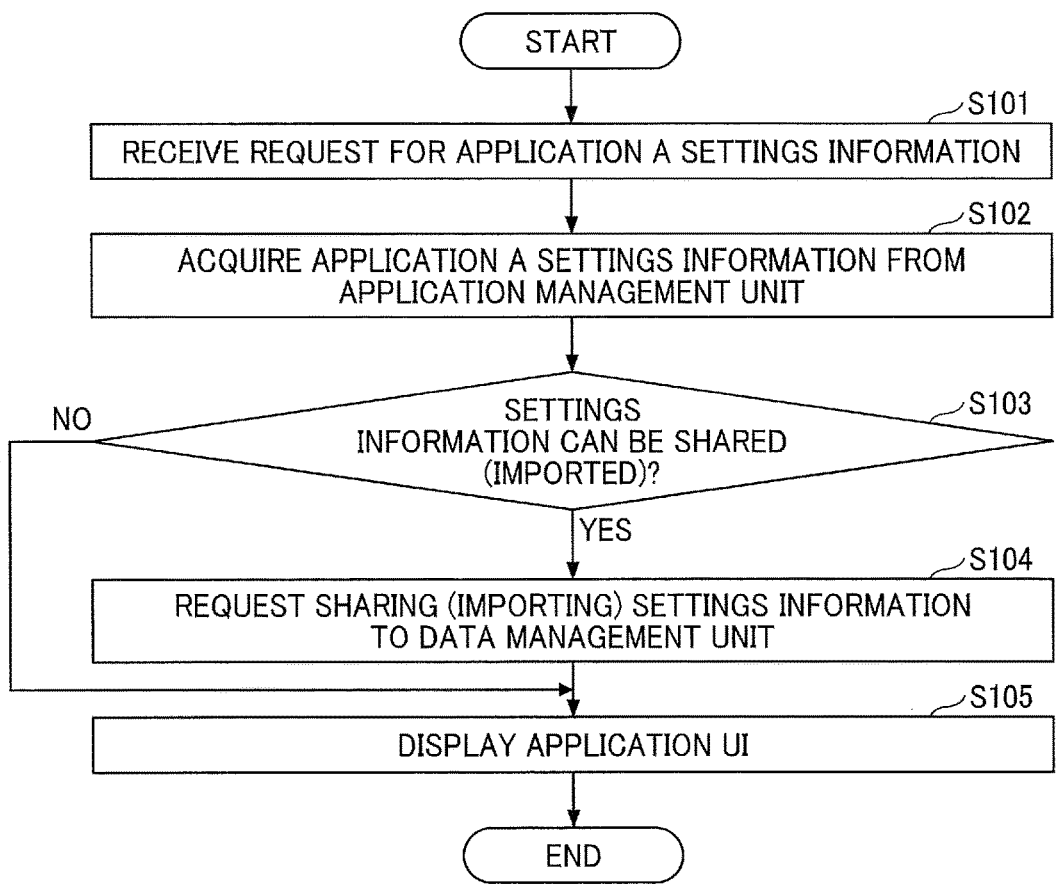
FIG. 11 is a diagram illustrating an example of description of settings (parameters) in JavaScript Object Notation (JSON) format.
FIG. 12 is a flowchart illustrating an example of a process of acquiring information on whether to share settings of an application.

With reference to FIGS. 7 to 10, an example of the database managed by the data management unit 47 is described. FIG. 7 illustrates an example of a user management database, which is a database that stores the user ID, a tenant ID for identifying the tenant to which the user belongs, and an organization ID for identifying the organization to which the user belongs. FIG. 8 illustrates an example of an application execution log database that stores an application execution log that includes the application ID, an application instance ID, the user ID, and a time when the application is executed. Here, the application instance includes information used for executing the application such as application settings, and when the same applications have different settings, each application is executed as a different application instance. As a result, even when the application ID and the user ID are the same, a plurality of application instances having different settings exist and an application having different settings for each user is executed. Also, sharing (importing) the application settings of one user with (to) the application settings of another user is achieved by duplicating the application instance. This step is performed by the application duplication unit 43. FIG. 9 is a diagram illustrating an example of an application setting management database that stores the application ID and corresponding initial setting value. The initial setting value may be an initial value used when the setting value of the application is not set or may be a setting value normally used. The initial setting value may be called a default parameter. Further, the setting value may be called a setting. Hereinafter, the setting value is called a setting. FIG. 10 is a diagram illustrating an example of an application instance settings management database that stores the unique settings of a certain application instance of a certain user and information indicating whether the settings can be (is allowed to be) shared with the other users. "TRUE" indicates that the settings can be shared and "FALSE" indicates that the settings cannot be shared. Here, the setting may be called a parameter, and "sharing the settings" may be expressed as "importing the settings". FIG. 11 is a diagram illustrating an example of description of settings (parameters) in JavaScript Object Notation (JSON) format. In the example illustrated in FIG. 11, a setting of the application that uploads the file to the external storage service is described in JSON format. The data management unit 47 also manages the organization database described below, used by the user analysis unit 46 at the time of analysis.

With reference to a flowchart illustrated in FIG. 12, a process of acquiring the settings sharing enablement information indicating whether the settings of the application can be shared (imported) is described. Here, when a user executes the application A, information on whether the settings of the application A associated with another user can be shared is acquired.

In step S101, the application execution unit 42 receives a request from the electronic device 20 to acquire the settings sharing enablement information indicating whether the settings of the application A can be shared (imported). The request includes the application ID of the application A.

In step S102, the application execution unit 42 transmits the received request message to the application management unit 51 in order to acquire the settings sharing enablement information. The application management unit 51 acquires the settings sharing enablement information from the application instance settings management database and transmits the settings sharing enablement information to the application execution unit 42.

In step S103, the application execution unit 42 confirms the acquired settings sharing enablement information and moves to step S104 when there are settings of the application A that can be shared and moves to step S105 when there is no setting that can be shared.

In step S104, the application execution unit 42 sends the settings sharing enablement information to the data management unit 47 and requests a user list to be used in the UI screen for importing the application settings that is to be displayed on the electronic device 20.

Figure 13:
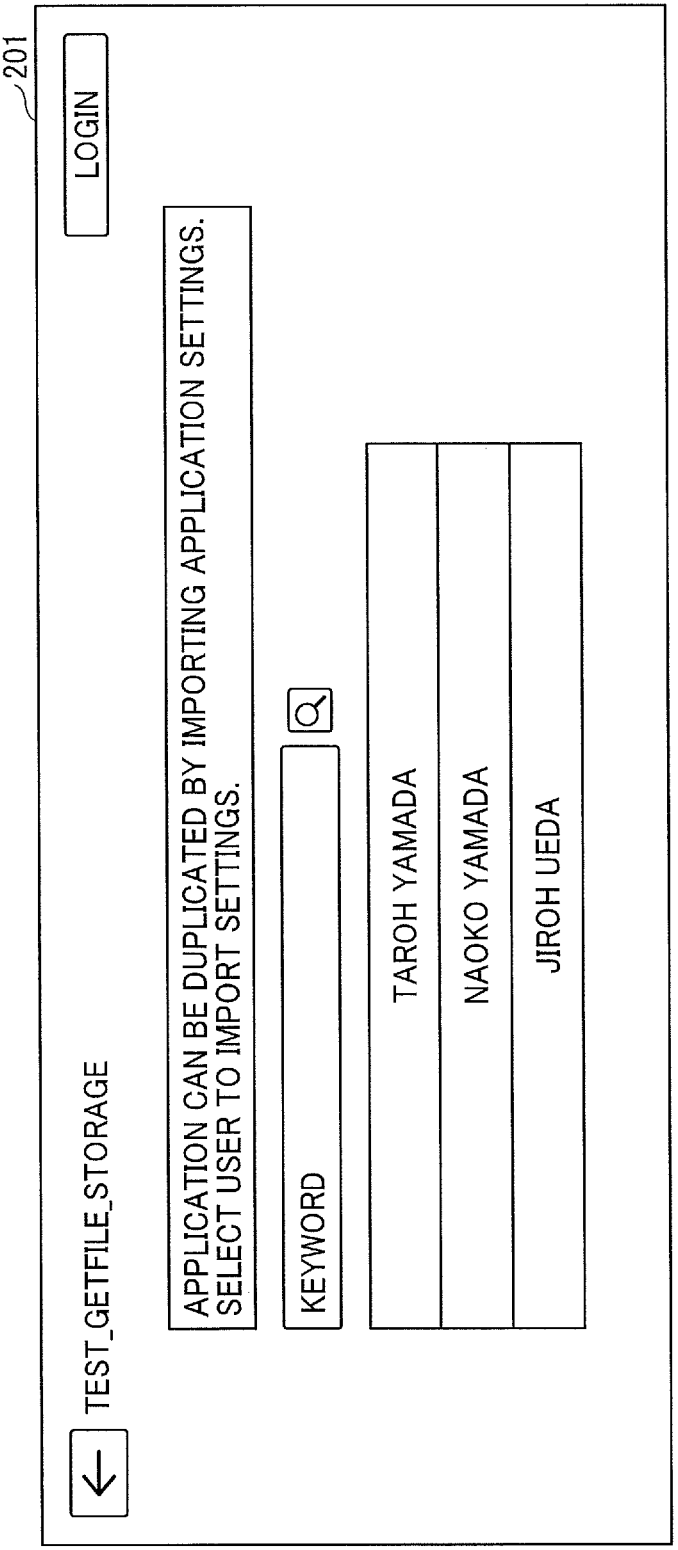
FIG. 13 is a diagram illustrating an example of a user interface (UI) screen for importing application settings.

In step S105, the UI screen of the application A is displayed on the electronic device 20. When there are settings of the application A that can be shared, the UI screen for importing the application settings is displayed using the user list created by the data management unit 47, and when not, a default UI screen is displayed. FIG. 13 is a diagram illustrating an example of the UI screen for importing the application settings. By selecting a displayed username, application settings of the selected user can be imported. The displayed username is determined by the analysis unit 44 based on the frequency with which the application settings are executed and inter-organizational distance with the user who imports the settings.

The analysis unit 44 includes an application analysis unit 45 and a user analysis unit 46, and each analysis unit accesses a database managed by the data management unit 47 in response to a request from the data management unit 47 and analyzes the frequency of application execution and a degree of user relevance in the organization. With reference to the flowchart illustrated in FIG. 14, a process executed by the application analysis unit 45 and the user analysis unit 46 is described.

In step S111, the analysis unit 44 receives a request to import application settings from the data management unit 47.

In step S112, the application analysis unit 45 analyzes the application settings with high execution frequency for the application ID designated by the data management unit 47 using the application execution log database illustrated in FIG. 8. Since the difference in the application settings for each user ID is distinguished by the application instance ID, the execution frequency for each application instance ID may be aggregated in the analysis. The application execution time may be designated, and only the application instance ID within the designated execution time may be selected. The execution time may be designated by requesting the user to input when the application is executed or may be set in advance from the UI screen for setting. FIG. 15 is a diagram illustrating an example of a list in which data of an application ID to be investigated is extracted from the application execution log.

In step S113, the application analysis unit 45 creates a user list in which users are arranged in descending order of the number of executions from the table in which the number of executions is aggregated. FIG. 16 illustrates a list in which the number of executions of each application instance is aggregated from the list of FIG. 15 and arranged in descending order of the number of executions. The target to be included in the list may be limited to a prefixed number of executions or the application instance ID.

In step S114, the user analysis unit 46 executes an analysis on the degree of relevance in the organization between the user who executes the application and the user listed in the user list created in step S113 and sorts the user list in order of the user with higher relevance. The analysis method is described after the description of the flowchart.

Figure 17:
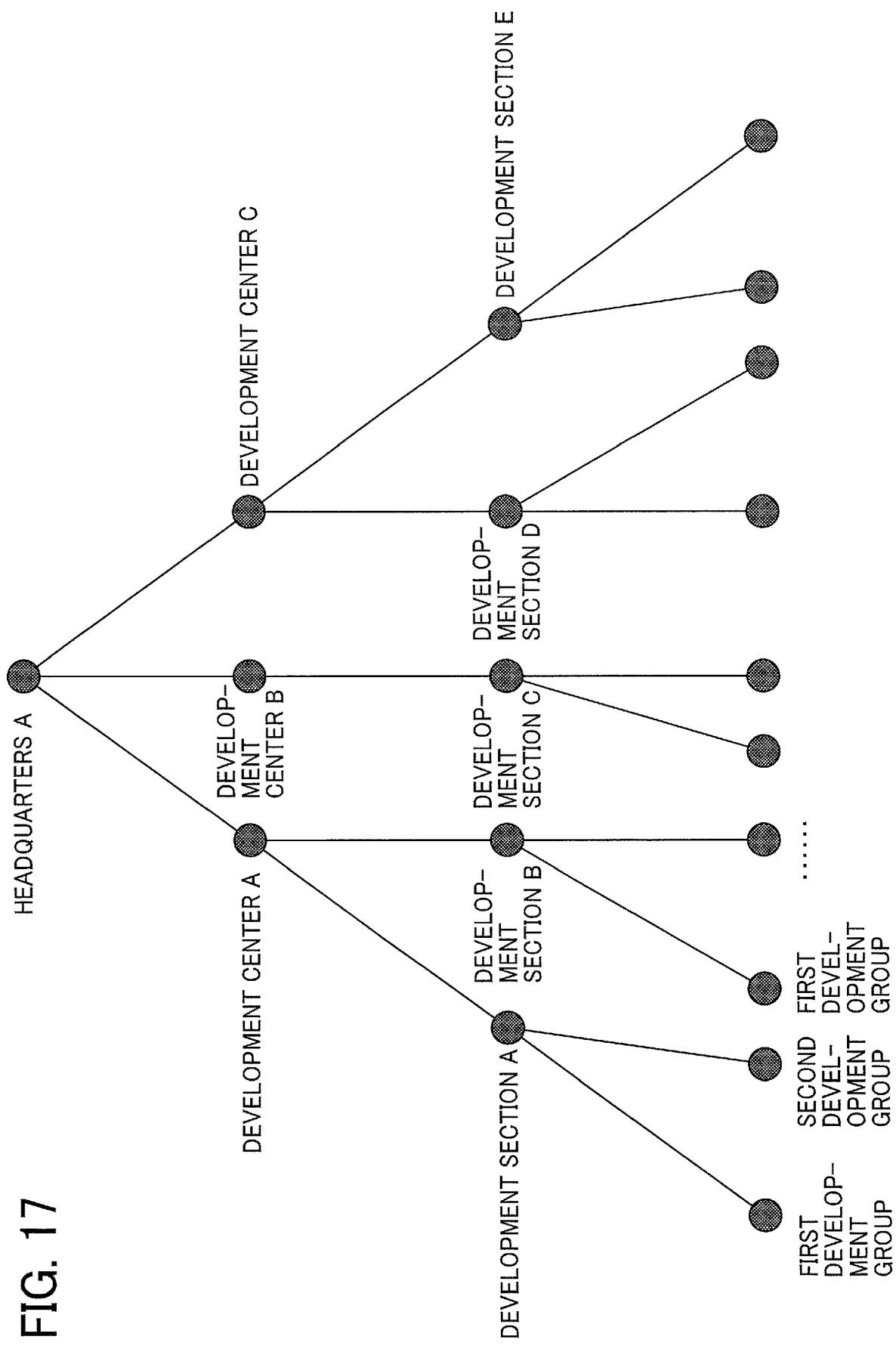
FIG. 17 is a diagram illustrating an example of a structure of organizations according to embodiments of the present disclosure.
Figure 19:
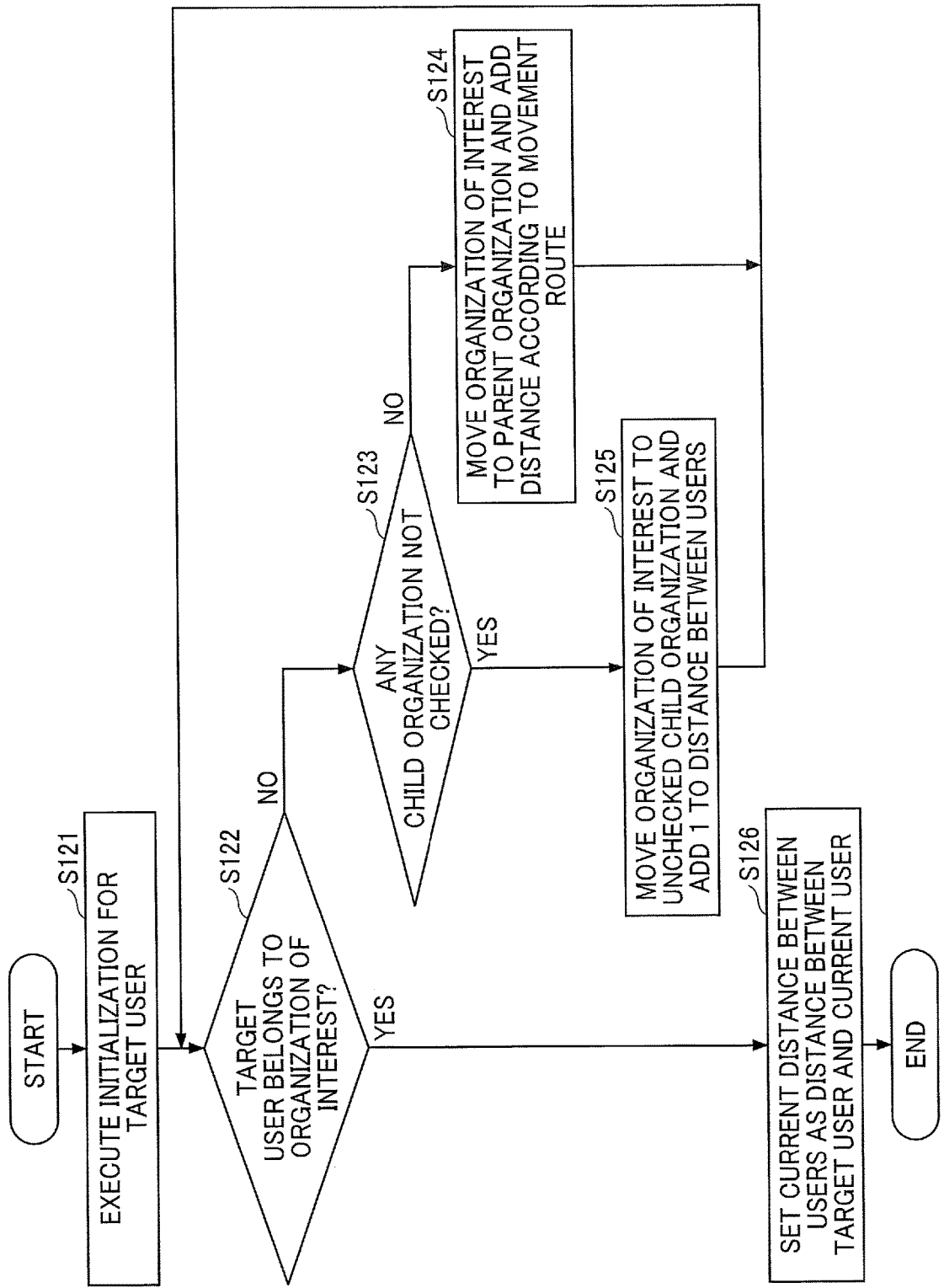
FIG. 19 is a flowchart illustrating an example of a process for analyzing a degree of relevance between users.

In step S115, the analysis unit 44 transmits the created user list to the data management unit 47. Then the data management unit 47 transmits the received user list to the electronic device 20 and request to display the user list on the UI screen of the application. The analysis method executed by the user analysis unit 46 in step S114 is described in the following. FIG. 17 is a diagram illustrating an example of a structure of organizations according to the present embodiment. The structural diagram has a tree structure that branches from headquarters A, which is the highest organization, to the lower organizations. As illustrated in FIG. 18, the data management unit 47 manages this structural diagram as an organization database having elements of an organization ID, an organization name, a parent organization ID, and a child organization ID. FIG. 19 is a flowchart illustrating an example of a process of analyzing the degree of relevance between users executed by the user analysis unit 46. Here, the distance between users in the structural diagram of the organization defined by the rules and procedures described below is calculated as the degree of relevance between the user who executes the application (hereinafter referred to as a current user) and the user listed in the user list (hereinafter referred to as a target user).

Rule:
When moving an organization of interest to a higher organization (the parent organization) on a route connecting the organization to which the current user belongs and the highest organization, add 1 to the distance between users.
When moving the organization of interest to the parent organization other than the above, subtract 1 from the distance between users.
When moving the organization of interest to a lower organization (the child organization), add 1 to the distance between users.

Processes described below are executed following the rules described above.

In step S121, before starting the calculation of the distance between the current user and a target user, distance between the users is set to 0 as initialization, and the organization of interest is set to the organization to which the current user belongs.

In step S122, whether the target user exists in the organization of interest is confirmed, and when the target user exists (YES at S122), the process proceeds to step S126, and when the target user does not exist (NO at S122), the process proceeds to step S123.

In step S123, whether there is a child organization that has not been checked is confirmed, and when there is the child organization that has not been checked (YES at S123), the process proceeds to step S125, and when all the child organizations have been checked (NO at S123), the process proceeds to step S124.

In step S124, the organization of interest is moved to the parent organization, and the distance is added according to the movement route based on the rule. After step S124, the process returns to step S122.

In step S125, the organization of interest is moved to the unchecked child organization, and 1 is added to the distance between users. After step S124, the process returns to step S122.

In step S126, the current distance is set to the distance between the target user and the current user.

According to the above process, the distance between the current user and the target user is calculated for all the target users. FIG. 20 illustrates an example of the result of calculating the distance between the users. The number of executions calculated by the application analysis unit 45 is combined with this aggregation result. FIG. 21 is a diagram illustrating a result of combining the list of FIG. 20 with the number of executions of the list of FIG. 16. Finally, by rearranging the list in FIG. 21 in ascending order of the distance between the users, a user list illustrated in FIG. 22 is obtained.

Referring again to FIG. 6, further description is given below. The service processing unit 50 includes an application management unit 51, a logic processing unit 52, and a data I/F unit 53.

The application management unit 51 acquires application information from the application information storage unit 55 and transmits the application information to the logic processing unit 52, the application execution unit 42, and the like in response to a request from the logic processing unit 52, the application execution unit 42, and the like.

The logic processing unit 52 requests the application management unit 51 and the application execution unit 42 for application information or application execution in response to a request from the web browser 21 of the electronic device 20.

The data I/F unit 53 makes a request to the data processing unit 72 of the storage service link unit 70, such as acquisition of a file list, in response to a request from the web browser 21 of the electronic device 20.

The document service unit 60 is a group of one or more programs (modules) for implementing the service. The document service unit 60 includes an OCR processing unit 61, a print conversion processing unit 62, and the like. The OCR processing unit 61 provides an OCR service, and the print conversion processing unit 62 provides a service for converting a data file into print data.

The storage service link unit 70 includes a file processing unit 71 and a data processing unit 72, and requests execution of each process to the external storage service 80 in response to a request from the logic processing unit 52 and the data I/F unit 53. The file processing unit 71 includes a common I/F and a unique I/F in which an application programming interface (API) for performing an operation on a file stored in the external storage service 80 is defined. The data processing unit 72 includes the common I/F and the unique I/F in which the API for acquiring metadata such as document information of a file stored in the external storage service 80 is defined.

The electronic device 20 includes a second communication unit 22, an operation reception unit 23, and a display control unit 24, which are implemented by the web browser 21. The web browser 21 downloads screen information from the information processing system 10. Each functional unit is implemented by the CPU 901 executing an instruction included in one or more programs included in the downloaded screen information. The second communication unit 22, the operation reception unit 23, and the display control unit 24 may be implemented by a native application instead of the web browser 21.

The second communication unit 22 transmits and receives information related to the application to and from the information processing system 10. The operation reception unit 23 receives operation of the user on various screens displayed on the display panel 940*a*. Of the screen information, the structure of the web page is mainly defined by HTML, the operation of the web page is defined by the script language, and the style of the web page is defined by CSS. The display control unit 24 interprets the screen information of various screens and displays the screens on the display panel 940*a*.

Figure 23:
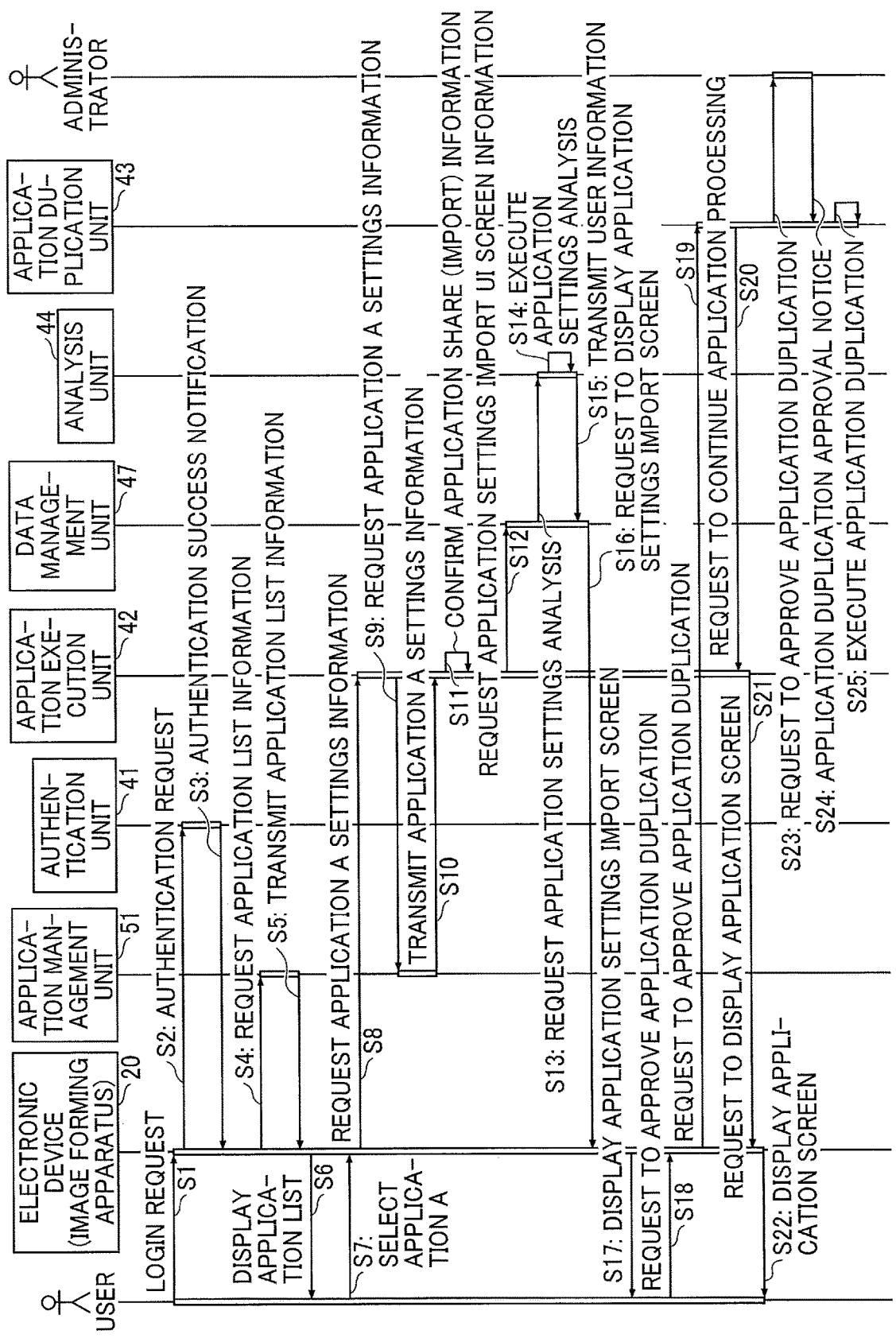
FIG. 23 is a sequence diagram illustrating an example of a process according to a first embodiment of the present disclosure

When executing the application in the present embodiment, people who frequently use the application in the organization to which the user belongs are displayed on the screen in order, and in response to a selection of a particular person, whether to duplicate the application that reflects that person's settings is suggested. FIG. 23 is a sequence diagram illustrating an example of a process executed by the information processing system 10. In this process, the information processing system 10 analyzes the application settings used in the organization for the application executed by the electronic device 20 and imports the settings after displaying the frequently used settings on the UI screen of the application. The process illustrated in FIG. 23 is described in the following.

In step S1, the user inputs a login ID and password into the electronic device 20. The operation reception unit 23 of the electronic device 20 receives the login ID and password.

In step S2, the second communication unit 22 of the electronic device 20 transmits an authentication request message including the login ID and password to the authentication unit 41.

In step S3, the first communication unit 40 of the information processing system 10 receives the authentication request message, and the authentication unit 41 executes the authentication process using the login ID and password included in the login request message. Here, it is assumed that the authentication is successful, and the authentication unit 41 sends an authentication success notification to the electronic device 20.

In step S4, the second communication unit 22 of the electronic device 20 receives the authentication success notification and transmits a message requesting to display a list of applications (or workflow applications) that can be executed by the user to the application management unit 51 of the service processing unit 50 of the information processing system 10.

In step S5, the first communication unit 40 of the information processing system 10 receives the message requesting display of the list and transmits the received request to the application management unit 51. The application management unit 51 acquires the list of applications that can be executed by the user from the application information storage unit 55 and transmits the list to the electronic device 20.

In step S6, the second communication unit 22 of the electronic device 20 receives the information of the application list, and the display control unit 24 of the electronic device 20 displays the list of applications that can be executed by the user on the display panel 940*a* based on the received information.

In step S7, the user selects an application A from the displayed list of applications.

In step S8, the second communication unit 22 of the electronic device 20 transmits a message requesting the information of the application A to the application execution unit 42. The request message includes an ID that identifies the application A.

In step S9, the application execution unit 42 transmits a message to the application management unit 51 requesting the application information (screen definition, processing content) required when executing the application A and the settings sharing enablement information indicating whether the settings of the application A can be shared (imported). The message includes the ID that identifies the application A.

In step S10, the application management unit 51 acquires the application information from the application information storage unit 55, acquires the settings sharing enablement information from the application instance settings management database, and transmits the acquired information to the application execution unit 42.

In step S11, the application execution unit 42 confirms whether there are settings of the application A that can be shared from the acquired settings sharing enablement information. Here, it is assumed that there are settings that can be shared.

In step S12, the application execution unit 42 sends the settings sharing enablement information to the data management unit 47 and requests a user list to be used in the UI screen for importing the application settings to be displayed on the electronic device 20.

In step S13, the data management unit 47 transmits the settings sharing enablement information to the analysis unit 44 and requests the analysis unit 44 to create the user list.

Figure 14:
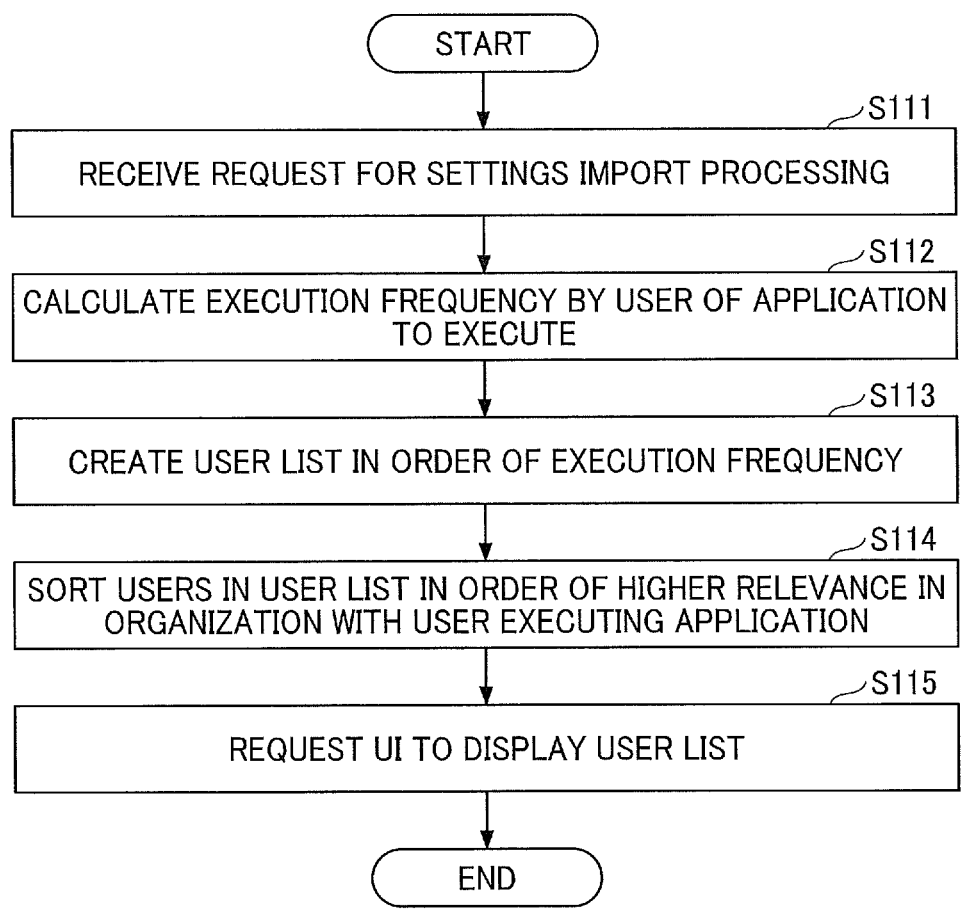
FIG. 14 is a flowchart illustrating an example of an analysis process of application execution frequency and user relevance.

In step S14, the analysis unit 44 creates the user list by executing the analysis process illustrated in the flowchart of FIG. 14 based on the received information.

In step S15, the analysis unit 44 transmits the created user list to the data management unit 47.

In step S16, the data management unit 47 transmits the received user list to the electronic device 20 and requests to display the UI screen for importing the application settings. This request may be made through the application execution unit 42 or the application management unit 51. The user list may include settings (parameters) of each user. Further, instead of the user list, the information on the UI screen to be displayed on the electronic device 20 may be sent.

In step S17, the display control unit 24 of the electronic device 20 displays the UI screen for importing the application settings on the display panel 940*a* using the received user list. FIG. 13 illustrates an example of the screen displayed here.

In step S18, the user selects one of the users associated with the application settings that the user wants to import and sends an application duplication approval request message for obtaining the approval of the administrator to execute the duplication of the application using the settings.

In step S19, the second communication unit 22 of the electronic device 20 transmits an application duplication approval request message to the application duplication unit 43.

In step S20, the application duplication unit 43 receives the application duplication approval request message and transmits an application processing continuation request message for displaying the default UI screen of the application A to the application execution unit 42.

In step S21, the application execution unit 42 transmits the received message to the application management unit 51.

In step S22, the display control unit 24 of the electronic device 20 displays the default UI screen of the application A.

In step S23, the application duplication unit 43 requests the administrator to approve the application duplication. For example, on the application duplication management screen illustrated in FIG. 24, the administrator approves the application duplication approval request from the user.

Figure 25:
FIG. 25 is a diagram illustrating an example of an application duplication request approval screen.

In step S24, in response to the approval of the application duplication approval request by the administrator, a result is transmitted to the application duplication unit 43. For example, on the application duplication management screen of FIG. 24, in response to the selection of user to approve the application duplication and a pressing of the "APPROVAL SCREEN" button by the administrator, the screen transitions to the application duplication approval screen illustrated in FIG. 25, and in response to pressing of an "APPROVE" button, the approval is completed and the approval result is transmitted to the application duplication unit 43.

Figure 26:
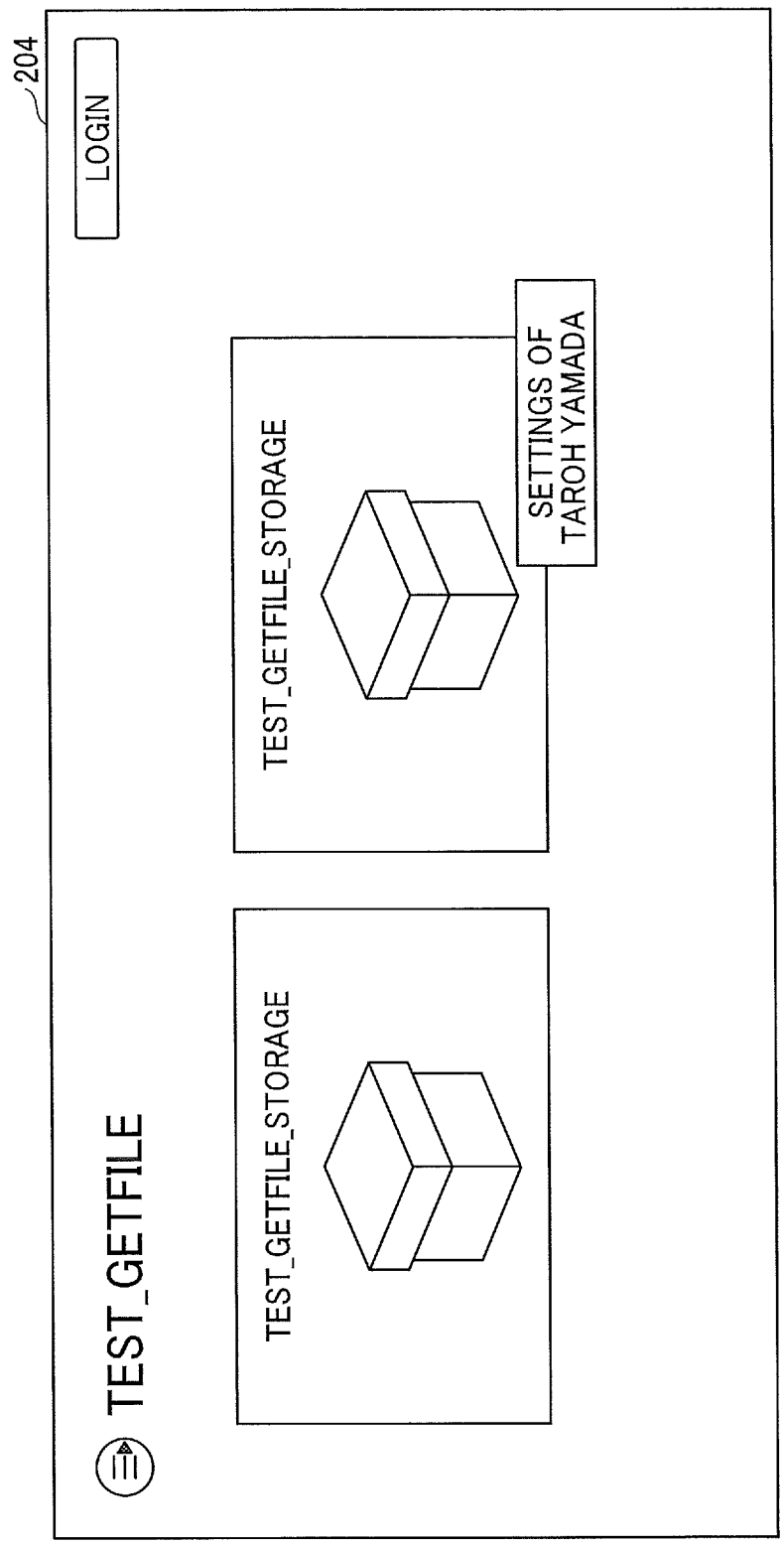
FIG. 26 is a diagram illustrating an example of the UI screen of an application list after executing application duplication.

In step S25, the application duplication unit 43 executes the approved application duplication. As a result, the user can execute the application with the requested settings simply by selecting the duplicated application. FIG. 26 is a diagram illustrating an example of the UI screen of application list after executing the application duplication. After that, the user can execute the application with the username "Taroh Yamada" by selecting the application displayed as "Taroh Yamada's settings" in the application list displayed in step S7 and the like. In addition, the contents of the application settings of each user may be displayed.

As described above, according to the present embodiment, the information processing system 10 analyzes the application settings used in the organization with respect to the application executed by the electronic device 20, and duplicates the application using the frequently used settings.

In the first embodiment, when duplicating the application, the application settings that are frequently used among the settings of other users in the organization to which the user who executes the application belongs are used.

In a second embodiment, the application is duplicated using the most frequently used application settings among the application settings used by the user who executes the application.

Figure 27:
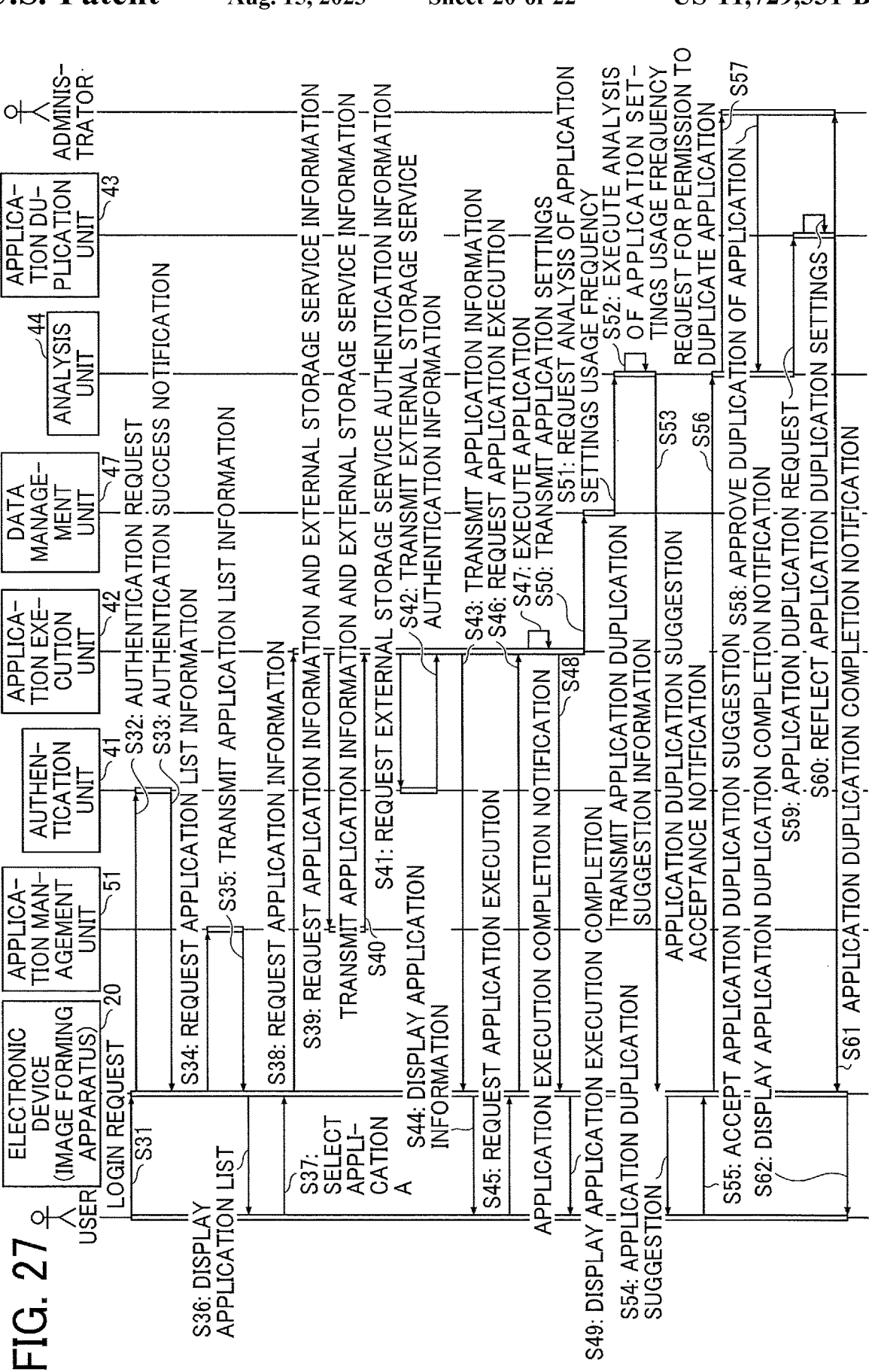
FIG. 27 is a sequence diagram illustrating an example of a process according to a second embodiment of the present disclosure.

FIG. 27 is a sequence diagram illustrating an example of a process in which the information processing system 10 analyzes the application settings used by the user with respect to the application executed by the electronic device 20 and suggests duplication of application using the most frequently used settings. The process illustrated in FIG. 27 is described in the following.

In step S31, the user inputs a login ID and password into the electronic device 20. The operation reception unit 23 of the electronic device 20 receives the login ID and password.

In step S32, the second communication unit 22 of the electronic device 20 transmits an authentication request message including the entered login ID and password to the authentication unit 41.

In step S33, the first communication unit 40 of the information processing system 10 receives the authentication request message, and the authentication unit 41 executes the authentication process using the login ID and password included in the login request message. Here, it is assumed that the authentication is successful, and the authentication unit 41 sends an authentication success notification to the electronic device 20.

In step S34, the second communication unit 22 of the electronic device 20 receives the authentication success notification and transmits a message requesting to display a list of applications (or workflow applications) that can be executed by the user to the application management unit 51 of the service processing unit 50 of the information processing system 10.

In step S35, the first communication unit 40 of the information processing system 10 receives a message requesting display of the list and transmits the received request to the application management unit 51. The application management unit 51 acquires the list of applications that can be executed by the user from the application information storage unit 55 and transmits the list to the electronic device 20.

In step S36, the second communication unit 22 of the electronic device 20 receives the information of the application list, and the display control unit 24 of the electronic device 20 displays the list of applications that can be executed by the user on the display panel 940a based on the received information.

In step S37, the user selects the application A from the displayed list of applications.

In step S38, the second communication unit 22 of the electronic device 20 transmits a message requesting the information of the application A to the application execution unit 42. The request message includes an ID that identifies the application A.

In step S39, the application execution unit 42 transmits a message to the application management unit 51 requesting the application information (screen definition, processing content) to be used when executing the application A, and an ID of the external storage service 80 accessed by the user. The message includes the ID that identifies the application A.

In step S40, the application management unit 51 acquires the requested application information and the ID of the external storage service 80 from the application information storage unit 55 and transmits the acquired information to the application execution unit 42.

In step S41, the application execution unit 42 transmits the ID of the external storage service 80 with which the application A is linked and the user authentication information (cookie) to the authentication unit 41, and requests cloud service information (access token) which is the authentication information required to access the external service.

In step S42, the authentication unit 41 transmits an access token necessary for the application execution unit to access the external service with the user's authority to the application execution unit 42 based on the received information. Here, the authentication unit 41 issues access tokens having different values for each type of external storage service to each user.

In step S43, the application execution unit 42 transmits to the logic processing unit 52, the application information (screen definition, processing content) for executing the application A.

In step S44, the second communication unit 22 of the electronic device 20 receives the application information, and the display control unit 24 displays the execution screen of the application A on the web browser 21 based on the received application information.

In step S45, the user operates the operation reception unit 23 of the electronic device 20 to request the execution of the application A.

In step S46, the second communication unit 22 of the electronic device 20 transmits a message to request execution of the application A to the application execution unit 42.

In step S47, the application execution unit 42 executes the application A.

In step S48, the application execution unit 42 transmits the execution completion notification of the application A to the electronic device 20.

In step S49, the display control unit 24 of the electronic device 20 displays the received execution completion of the application A on the display panel 940a.

In step S50, the application execution unit 42 transmits the settings of the executed application A to the data management unit 47. The data management unit 47 stores the received settings of the application A.

In the subsequent processing, the information processing system 10 suggests application duplication, but it is not necessary to continuously perform the processing up to this point. The application duplication may be suggested at the time when the application is executed a plurality of times, or at the time when the most frequently used settings are changed to different settings. In step S51, the data management unit 47 sends to the analysis unit 44, a message requesting that the frequency of use of the settings of the application A used by the user be analyzed. The message includes the user ID and the application ID to be analyzed.

In step S52, the application analysis unit 45 of the analysis unit 44 analyzes the usage frequency of the user's settings based on the received message and analyzes information on settings that are used most frequently (information that can identify settings such as user ID and application instance ID). The analysis method may be executed by specifying the designated user ID in the method described with reference to step S112 in FIG. 14. After the analysis is completed, the analysis unit 44 may store the analysis result in the database or send the analysis result to the data management unit 47.

In step S53, the analysis unit 44 transmits the information on an application duplication suggestion dialog screen to the electronic device 20. The information may be transmitted via the application management unit 51 or the application execution unit 42. Alternatively, the application management unit 51 or the application execution unit 42 may create information on the application duplication suggestion dialog screen. In addition, the information to be transmitted may include the information of the application settings.

Figure 28:
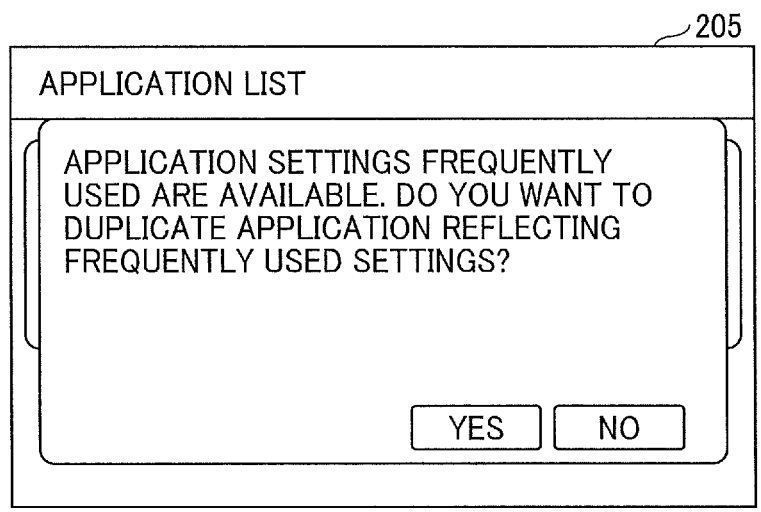
FIG. 28 is a diagram illustrating an example of an application duplication suggestion dialog screen.

In step S54, the display control unit 24 of the electronic device 20 displays the application duplication suggestion dialog screen on the display panel 940a using the received information. FIG. 28 is a diagram illustrating an example of the application duplication suggestion dialog screen.

In step S55, the user accepts the application duplication suggestion by operating the operation reception unit 23 of the electronic device 20. For example, an "YES" button on the screen illustrated in FIG. 28 is pressed.

In step S56, the second communication unit 22 of the electronic device 20 transmits an application duplication suggestion acceptance notification to the analysis unit 44.

In step S57, the analysis unit 44 notifies the administrator of an application duplication permission request. The notification to the administrator may be displayed when the administrator page of the service providing system 1 is accessed or may be transmitted by email. Alternatively, the notification may be made in the same method as described in step S23 of FIG. 23.

In step S58, the administrator approves the application duplication permission request, and the approval result is transmitted to the analysis unit 44. The approval by the administrator is done by pressing a button displayed on the administrator page or the received mail. When the administrator does not approve, no further processing is performed.

In step S59, the analysis unit 44 transmits a message requesting application duplication to the application duplication unit 43. The message includes information such as the user ID and the application instance ID that identifies the settings used in the application duplication.

In step S60, in response to the application duplication request message, the application duplication unit 43 executes the application duplication, and the application settings used at the time of duplication is stored as the most frequently used settings.

In step S61, the application duplication unit 43 transmits an application duplication completion notification to the electronic device 20 and the administrator. The notification to the administrator is performed in the same manner as in the method described in step S57.

Figure 29:
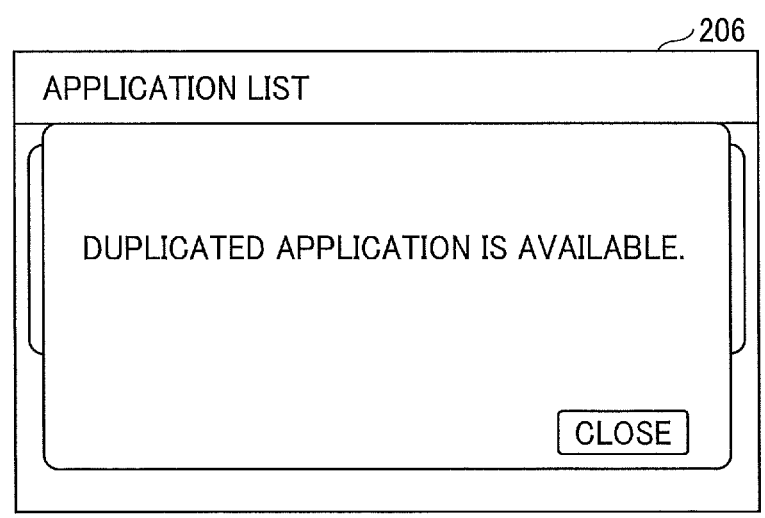
FIG. 29 is a diagram illustrating an example of an application duplication completion notification dialog screen.
Figure 30A:
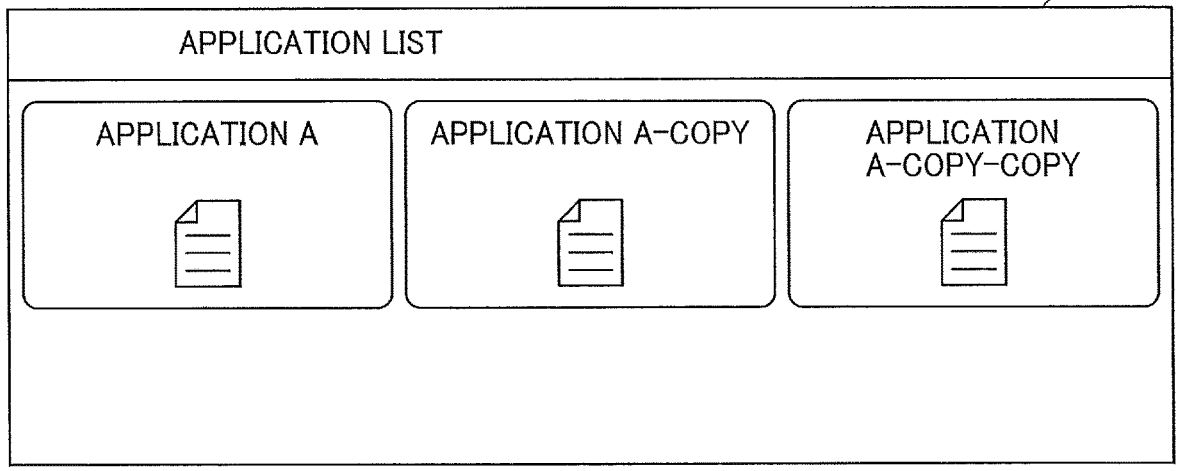
FIGS. 30A and 30B are diagrams illustrating examples of application list screens in which a duplicated application is displayed.
Figure 30B:
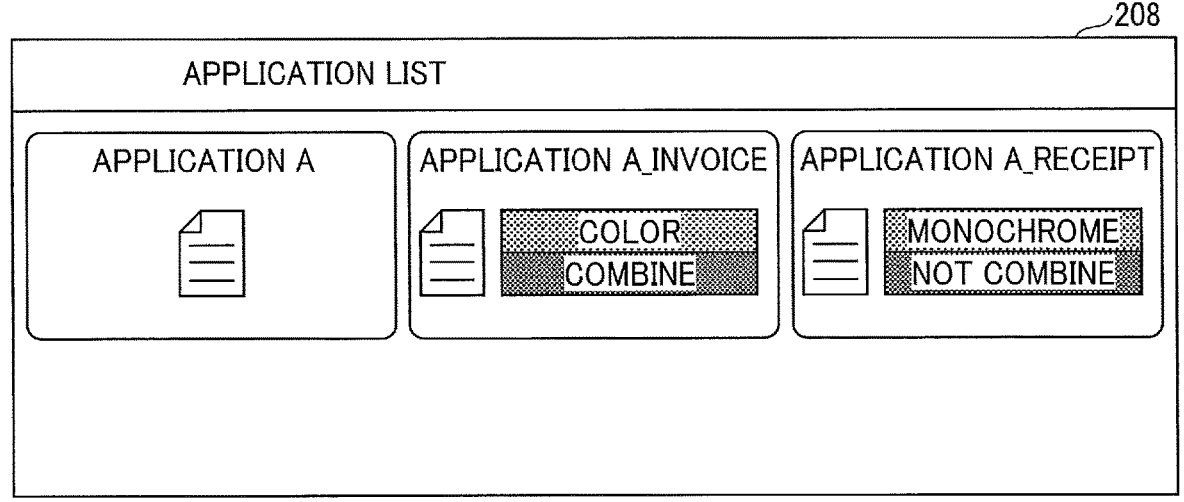

In step S62, the display control unit 24 of the electronic device 20 displays the received application duplication completion notification on the display panel 940a. FIG. 29 is an example of a completion notification dialog screen displayed on the display panel 940a of the electronic device 20. This notification may be displayed on the screen after the user logs in to the information processing system 10 from an information terminal such as the PC or may be transmitted by email to the user's email address. The duplicated application is displayed on the application list screen as illustrated in FIGS. 30A and 30B. FIGS. 30A and 30B illustrate two types of display methods. FIG. 30A does not display the identification information at the time of duplication and FIG. 30B displays the identification information at the time of duplication. As illustrated in FIG. 30A, by presenting the information on the main settings of the application, the convenience for the user in selecting the application is improved. In addition, the contents of the application settings may be displayed.

As described above, according to the second embodiment of the present disclosure, the information processing system 10 analyzes the application settings of the user who executed the application on the electronic device 20 and duplicates the application by using the settings most frequently used. Further, by duplicating the application for each setting and letting the user select the duplicated application, it is not necessary for the user to reset the setting in order to change the setting.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, the configuration example of the functional block diagram of FIG. 4 illustrates that functional blocks are divided according to the main functions in order to facilitate understanding of the processing by the information processing system 10 and the electronic device 20. The present disclosure is not limited by the way of dividing into the processing units or the names of the processing units. The processing of the information processing system 10 and the electronic device 20 can be further divided into more processing units according to the processing content. Further, one processing unit can be divided so as to include more processing units.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The apparatuses described are merely an illustration of one of several computing environments for implementing the embodiments disclosed herein. In one embodiment, the service providing system includes a plurality of computing devices such as server clusters. The plurality of computing devices is configured to communicate with one another through any type of communication link, including a network, shared memory, etc., and perform the processes disclosed herein.

The invention claimed is:

1. A service providing system comprising:
an electronic device; and
an information processing system connected to the electronic device through a network;
the information processing system including circuitry configured to:
store in one or more memories, a plurality of settings of an application that receives an execution request from the electronic device;
duplicate the application that uses one of the plurality of settings stored in the one or more memories to generate duplicated application; and
transmit information on the duplicated application to the electronic device, and
the electronic device including circuitry configured to:
display on a display, a screen for selecting an application to be executed by a user, the screen including the duplicated application for selection by the user,
wherein
the circuitry of the information processing system is further configured to:
analyze frequency of use of each of the plurality of settings of the application;
create a list of other users, each other user being stored in association with a candidate of settings used by the application to be duplicated, based on the frequency of use of each of the plurality of settings and corresponding other user who uses the setting;
transmit information of the list of the other users to the electronic device; and
display on the display, the list of the other users stored in association with the candidate of settings, for selection of the settings of the application to be duplicated by the user.

2. The information processing system of claim 1, wherein the circuitry of the electronic device is further configured to:
receive a selection of one of the other users associated with the settings used by the application to be duplicated from the list of the other users displayed on the screen;
transmit information of the one of the other users selected by the user to the information processing system; and
duplicate the application using the settings of the one of the other users selected by the user.

3. The information processing system of claim 2, wherein the circuitry of the electronic device is further configured to:
display on the display, the duplicated application and the information of the one of the other users selected by the user on the screen for selecting the application to be executed by the user.

4. The information processing system of claim 1, wherein the circuitry of the information processing system is further configured to:
extract the most frequently used settings among the settings stored in association with the user;
transmit the information of the most frequently used settings to the electronic device; and
display on the display, a screen inquiring the user whether to duplicate the application using the most frequently used settings.

5. The information processing system of claim 4, wherein the circuitry of the electronic device is further configured to:
receive a selection by the user of whether to duplicate the application, on the screen inquiring the user whether to duplicate the application using the most frequently used settings;
transmit the selection by the user to the information processing system; and
in response to the selection by the user to duplicate the application, the circuitry of the information processing system is further configured to duplicate the application using the most frequently used settings.

6. The information processing system of claim 5, wherein the circuitry of the electronic device is further configured to:
display on the display, information on the settings used when the application is duplicated together with the duplicated application on the screen for selecting the application to be executed by the user.

7. An information processing method executed by an information processing system connected to an electronic device through a network, the method comprising:
storing a plurality of settings of an application that receives an execution request from the electronic device;
duplicating the application that uses one of the plurality of settings stored to generate duplicated application; and
transmitting information on the duplicated application to the electronic device to be displayed by the electronic device for selection by a user,
wherein
the method further comprises:
analyzing frequency of use of each of the plurality of settings of the application;
creating a list of other users, each other user being stored in association with a candidate of settings used by the application to be duplicated, based on the frequency of use of each of the plurality of settings and corresponding other user who uses the setting;
transmitting information of the list of the other users to the electronic device; and
displaying on the display, the list of the other users stored in association with the candidate of settings, for selection of the settings of the application to be duplicated by the user.

8. A non-transitory recording medium storing a plurality of instructions which, when executed by one or more processors, cause the processors to perform an information processing method comprising:

storing a plurality of settings of an application that receives an execution request from an electronic device;

duplicating the application that uses one of the plurality of settings stored to generate duplicated application; and transmitting information on the duplicated application to the electronic device to be displayed by the electronic device for selection by a user, wherein the method further comprises:

analyzing frequency of use of each of the plurality of settings of the application;

creating a list of other users, each other user being stored in association with a candidate of settings used by the application to be duplicated, based on the frequency of use of each of the plurality of settings and corresponding other user who uses the setting;

transmitting information of the list of the other users to the electronic device; and displaying on the display, the list of the other users stored in association with the candidate of settings, for selection of the settings of the application to be duplicated by the user.

* * * * *